July 20, 1943.  O. E. DIETRICH  2,324,618
REDUCED TIRE PRESSURE INDICATOR
Filed July 23, 1940  2 Sheets-Sheet 2
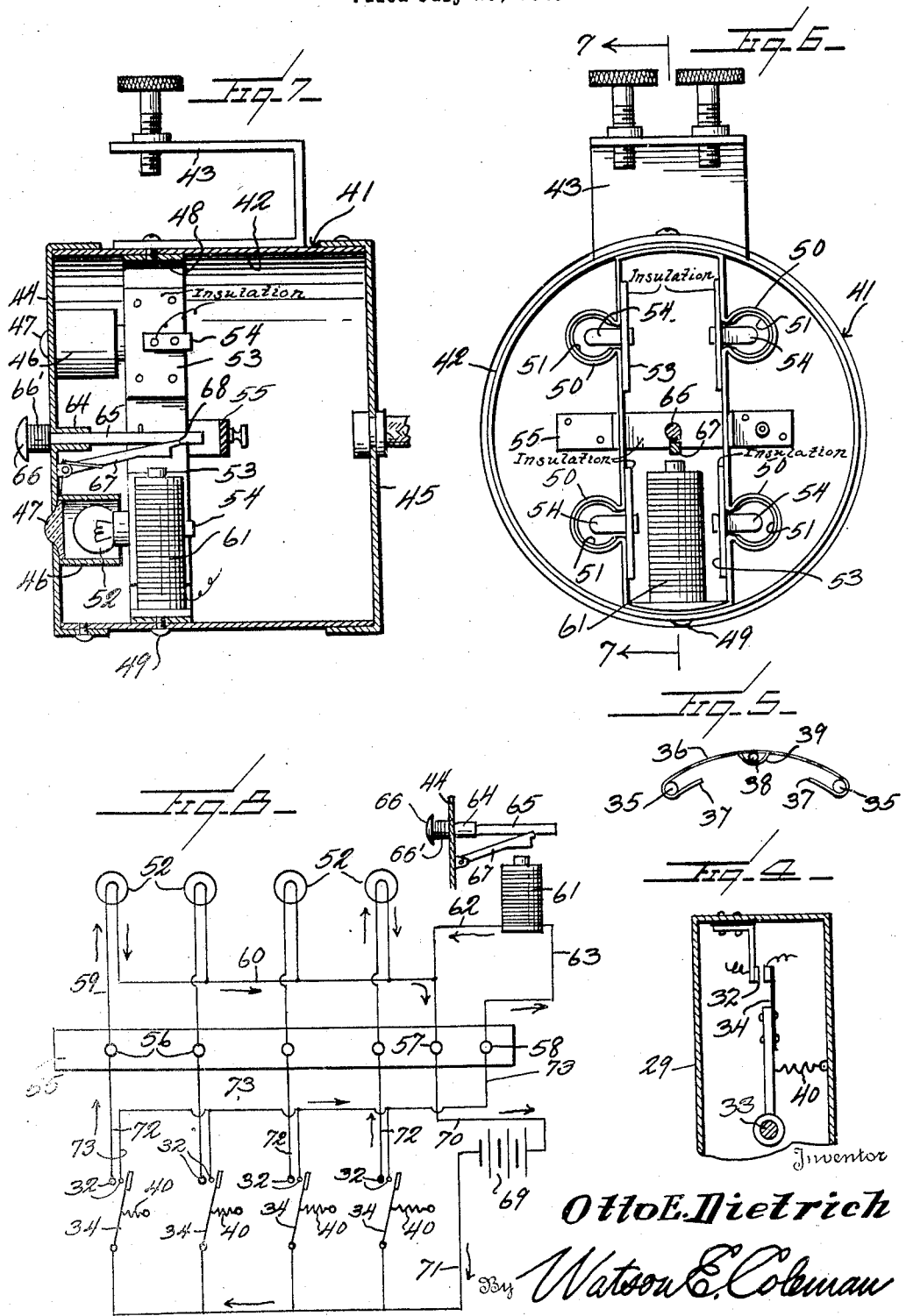
Inventor
Otto E. Dietrich
By Watson E. Coleman
Attorney Patented July 20, 1943

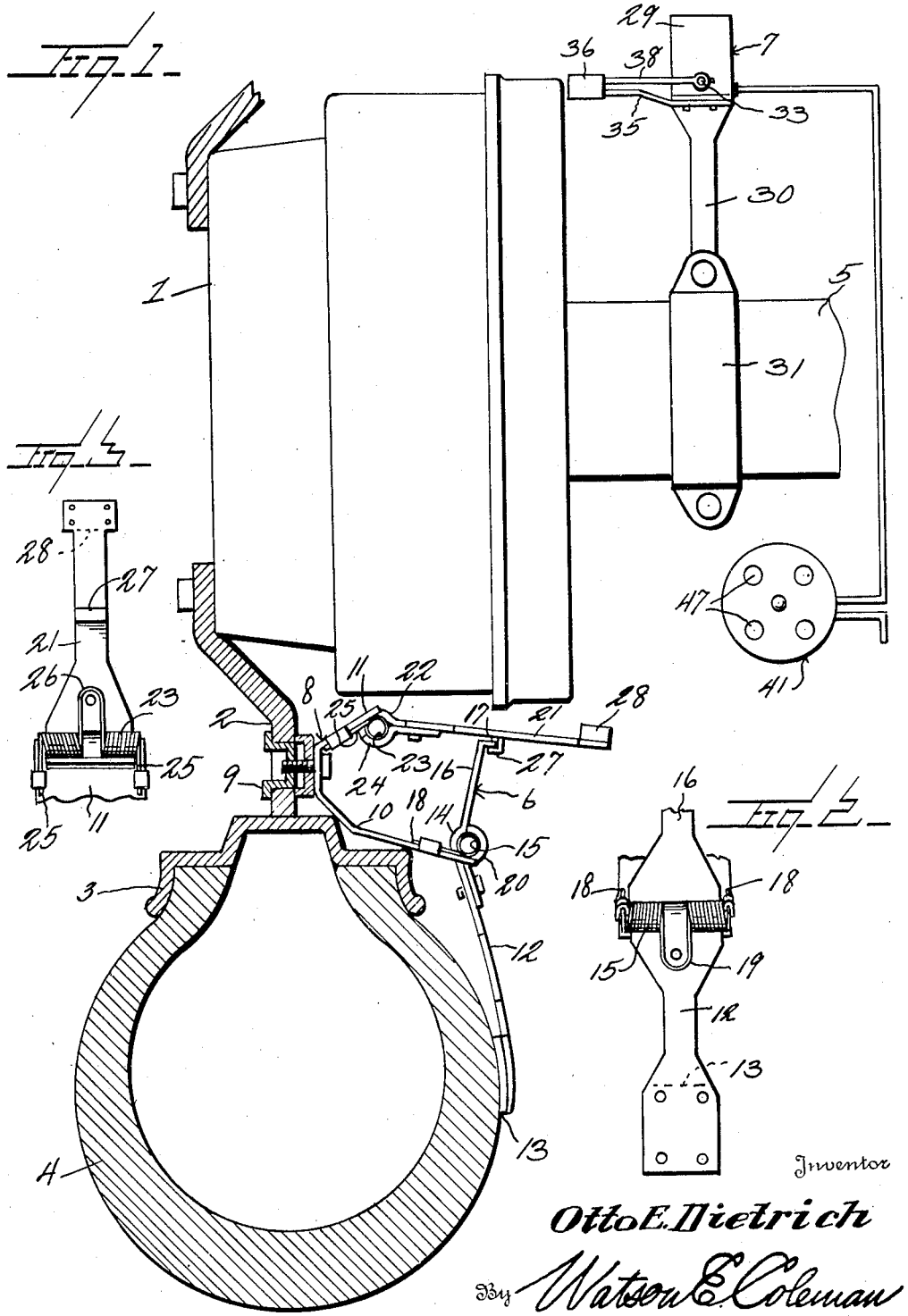

2,324,618

UNITED STATES PATENT OFFICE 2,324,618

REDUCED TIRE PRESSURE INDICATOR

Otto E. Dietrich, Morton, Ill.

Application July 23, 1940, Serial No. 347,016

3 Claims. (Cl. 200—58)

This invention relates to the class of air pressure indicating devices and pertains particularly to improvements in pressure indicators for the tires of motor vehicles.

It is, of course, well known that in order for a motorist to obtain the maximum wear from the pneumatic tires of his vehicle, such tires must be kept at all times fully inflated, but it is seldom that the average motorist concerns himself with regularly inflating his vehicle tires. Ordinarily the tires are not attended to until it is noticed that one or more is definitely under-inflated, as a result of which such tire, being run in an under-inflated condition, is subjected to strains and stresses which materially reduce its life of service.

The present invention has for its primary object to provide a novel, simple and inexpensive mechanism for application to motor vehicles, by means of which a decreased air pressure in any one of the vehicle's tires below normal or standard pressure, will be promptly indicated to the operator of the vehicle so that attention may be given such tire and the life of the tire, therefore, extended to the maximum.

A further and more specific object of the invention is to provide in a tire deflation signal or indicating device for motor vehicles, a novel mechanism for transmitting a signal from any one of the vehicle's tires to an indicator unit mounted within the vehicle in a position where it may be readily seen by the vehicle operator.

Another object of the invention is to provide in an indicating mechanism of the character stated, a novel indicator or annunciator unit which is automatically energized through the closing of an electric circuit immediately that a tire of the vehicle becomes under-inflated, in which unit a light signal is energized simultaneously with the release of a movable member whereby double assurance is had of the driver being notified when a tire requires attention.

The invention will be best understood from a consideration of the following detailed description taken in connection with the accompanying drawings forming part of this specification, with the understanding, however, that the invention is not to be confined to any strict conformity with the showing of the drawings but may be changed or modified so long as such changes or modifications mark no material departure from the salient features of the invention as expressed in the appended claims.

In the drawings:

Fig. 1 is a view illustrating the application of the present device to a vehicle tire.

Fig. 2 is a view in elevation of the casing engaging portion of the switch trip.

Fig. 3 is a view in elevation of the lever plate of the switch trip.

Fig. 4 is a detailed sectional view showing the interior construction of a switch unit.

Fig. 5 is a view in edge elevation of the resilient plate forming a part of the switch unit.

Fig. 6 is a view in front elevation of the annunciator unit with the front plate removed and the incandescent bulbs removed.

Fig. 7 is a sectional view on the line 7—7 of Fig. 6.

Fig. 8 is a circuit diagram for the invention.

Referring now more particularly to the drawings, the numeral 1 designates a wheel of a motor vehicle upon which the signaling or indicating mechanism embodying the present invention is installed, such wheel including the spokes 2, the felly 3 and the tire 4 which is mounted upon the felly. The numeral 5 designates the axle upon which the wheel is mounted.

In carrying out the present invention, there is applied to each wheel a tire actuated switch tripping unit indicated generally by the numeral 6 and upon each axle of the vehicle adjacent to each wheel is mounted a switch unit indicated generally by the numeral 7.

Each of the switch tripping units comprises a bracket 8 which is secured to the inner side of the wheel by a suitable spoke engaging fastener 9 which supports the bracket in a position to extend axially inwardly from the wheel. The bracket 8 includes a relatively long lower arm portion 10 and a short upper portion 11, these portions being arranged in inwardly divergent relation. At the free end of the portion 10 there is mounted the oscillatable tire casing engaging arm 12 which is provided with a terminal or finger portion 13 which has direct contact with the wall of the tire casing at all times. This arm at its inner end is transversely channeled, as indicated at 14, to receive a portion of a coil spring 15 and the opposite end of the plate 12 is extended to form a latch finger 16 which at its free end terminates in a lateral bill 17. The coil spring 15 has its two ends 18 secured to the lower arm 10 while intermediate its ends, it is provided with the radially extended loop portion 19 which bears against the upper face of the plate 12 and is secured thereto by the arcuate strip 20 which covers a portion of the spring coils and cooperates with the channeled portion 14 of the plate to form a yoke which encircles the spring and which turns on the spring as a pivot or center.

The shorter arm 11 of the switch trip bracket has a tripping plate 21 connected therewith by a spring hinge support of the same character as that described in connection with the plate 12. The plate 21 at one end is provided with the transversely extending semi-cylindrical portion 22 which encircles a coil spring 23 of the same form as the spring 15 and which cooperates with an arcuate cover plate 24 to form a sleeve encircling the spring. The spring 23 has its two ends 25 secured to the portion 11 of the bracket while intermediate its ends the axially directed loop 26 is secured to the plate 21 by means of the plate 24. This spring 23 is biased or tensioned so as to normally swing the plate 21 inwardly toward the axle and the spring 15 is tensioned to constantly urge the plate 12 to swing toward the adjacent side wall of the tire. Thus the bill end 17 of the latch 16 is normally urged to swing inwardly away from the wheel and this tendency is employed for maintaining a latching connection between the bill 17 and a keeper 27 which is carried by the trip plate 21. Thus when the switch tripping unit is set, the trip plate 21 will be held in restrained position against the tension of the spring 23 by the latch finger 16, and these parts maintain this relation at all times that the tire remains fully inflated.

The trip plate 21 is extended axially inwardly with respect to the wheel into an arm portion terminating in a contacting or wiper head 28 which functions to close a switch in the switch unit 7 when the latch 16 is disconnected from the hook or keeper 27.

The switch or circuit controlling unit 7 which is mounted adjacent each wheel upon an axle comprises a switch box or housing 29 mounted upon an arm 30 which is secured by a clamp or in any other suitable manner, as at 31, to the axle. Within the switch box 29 are secured two adjacent fixed terminals 32. Extending transversely through the box 29 is a rock shaft 33 upon which is supported within the box a resilient shiftable terminal 34 adapted to electrically engage the terminals 32. Secured rigidly to the switch box 29 is a pair of arms 35 which extend toward the adjacent wheel and at their free ends, these arms are joined together by the relatively wide upwardly bowed spring strip 36. The connection between the arms 35 and the adjacent end of bowed spring strip is such as to permit a slight flexing or flattening of the spring strip without permitting the same to become detached from the arms. The arrangement here shown for permitting this action consists in the turning back upon the under side of the strip of the relatively long fingers 37 adjacent the four corners of the strip between which fingers and the body of the strip the arms extend.

Attached to the shaft 33 carrying the movable switch terminal 34 is a lever 38 which extends outwardly and across the adjacent strip 36 at the center of the latter or midway between the supporting arms 35. This lever 38 is secured to the strip 36 as indicated at 39, and thus it will be seen that if the strip 36 is forced radially inwardly, it will effect the rocking of the arm 38 and of the shaft 33 so as to move the shiftable terminal 34 towards the fixed terminal 32.

The terminals 32 and 34 are normally held in spaced relation by the coil spring 40 which is secured at one end to the movable terminal 34 and has its other end secured to a portion of the switch housing 29, as shown in Fig. 4. Each of the switches which is carried adjacent a wheel controls an electric circuit having therein a signal lamp and also controls another visual indicator which is common to all of the switches, as will be hereinafter described. The signal lamps for the wheels or tires together with the said other visual indicator which is common to all of the tires, are mounted within a housing which is indicated generally by the numeral 41 and which is disposed in some convenient position within the vehicle where it may be readily seen and reached by the vehicle operator. The signal housing comprises an annular body or shell portion 42 to which is secured a mounting bracket 43 by which the housing can be attached to a convenient fixture of the vehicle such as the edge of the vehicle instrument panel. Closing the ends of the housing body 42 are the front and rear wall caps 44 and 45, respectively. The front cap is provided upon its inner side with the short tubular shells 46 which extend axially of the housing and each of which at its outer end encircles a lens 47 which may be red or of any other suitable color. The lens is fixed in an aperture of the wall of the cap 44.

Mounted within the casing 41, in the shell or annular part 42 is an elongated frame 48, the short transverse walls at the upper and lower ends of which are secured in a suitable manner as by means of attaching screws 49 to the shell 42. The two vertical side portions of the frame 48 are provided each with the two outwardly bowed sleeve portions 50 which enclose metallic shells or sockets 51 in each of which is threadably engaged an incandescent light bulb 52. Upon the inner side of each of the long side portions of the frame 48 are secured adjacent each light socket 51, an insulation plate 53 which carries a contact finger 54 which is disposed at the axial center of the adjacent socket for engagement by the central terminal or contact of the incandescent bulb which will be located in the adjacent socket.

Mounted upon and secured transversely to the frame 48 is a terminal panel 55 of insulation material which carries four metallic terminal screws 56 and the two terminals 57 and 58. Each of the terminal screws 56 has a side of an incandescent lamp 52 electrically coupled therewith by the wire 59 while the terminal 57 has the other side of each of the incandescent lamps electrically connected therewith through the conductor 60.

Mounted in the lower part of the frame 48 is an electromagnet 61, one side of which is electrically coupled by the wire 62 with the terminal 57 which is common to all of the lamps while the other side of the coil is connected by the conductor 63 to the terminal 58.

Supported by and extending through the central part of the front cover 44 for the light housing, preferably in a guide sleeve 64, is a mechanical annunciator in the form of a bar 65 having the head 66 upon the end which is disposed in front of the cover 44. Between the head and the cover 44, a coil spring 66' is interposed. Upon the inner side of the cover 44 is pivotally mounted an armature latch 67 which extends across the upper end of the core of the magnet 61 and has its free end arranged for engagement in a notch 68 in the bar 65 when the latter is pressed inwardly to the limit of its movement against the resistance of the spring 66.

The numeral 69 designates a source of electric potential for the operation of the system, such as a battery and this may be the battery of the motor vehicle upon which the mechanism is mounted. One side of this battery is connected by the conductor 70 with the common terminal 57 while the other side of the battery is connected through the conductor 71 with the movable terminal 34 of each of the switch units. One of the two other terminals 32 of the switch unit is connected by a current conductor 72 with a lamp terminal screw 56 and the other one of the two terminals 32 of each switch unit is electrically connected by the conductor 73 with the electromagnet terminal 58.

The terminal 57, which is common to the lamps and to one side of the electromagnet may be electrically connected through the frame 48 with the negative side of the battery if desired, so that this terminal or connection or, if desired, a conductor such as is indicated at 70 in the diagram in Fig. 8 may be employed.

From the foregoing, it will be readily apparent that when all of the pneumatic tires of the vehicle in which the indicator mechanism is mounted, are at full pressure, the arm 12 of each switch control unit will be engaged with the side wall of the adjacent tire and the latch finger 16 will be in operative connection with the trip plate 21 to hold the same in a position where its outer or free end will fail to engage the adjacent spring plate 36. The mechanical annunciator 65 will be disposed inwardly with respect to the front plate or head 44 of the incandescent lamp housing and held in this position by the armature latch bar 67. The terminals of all of the switch units will, of course, be separated so that the circuits controlled by the switch units are open.

Should any one of the tires of the vehicle develop a leak, then that tire will bulge or expand at the lower part where it engages the ground and in so expanding or bulging, will impose pressure against the adjacent spring held arm 12, thus oscillating the latch 16 for the release of the trip plate 21. The free end 28 of the trip plate will then oscillate toward the axial center of the wheel and as the wheel rotates, the free end of this plate will ride onto the overlying spring 36 and cause the spring carrying arm 38 to rock, thereby oscillating the attached terminal 34 into contact with the adjacent fixed terminal 32. This will result in the flow of electric current from the battery 69 through the switch to the incandescent lamp 52, which is connected in circuit with the closed switch, thereby giving the necessary warning to the vehicle operator that that particular tire needs attention. It will be seen upon reference to the circuit layout that current will at the same time flow through the conductor 73 to the electromagnet 61 and back by way of the common or ground terminal 57 to the battery, the return current from the energized lamp also returning through this terminal. When the magnet is energized, the armature 67 will be attracted, thus releasing the mechanical annunciator bar 65. In this way, a double warning is given to the operator and the mechanical annunciator serves to attract the operator's attention if he should fail to notice that the incandescent lamp is illuminated. This would be particularly likely to occur in the daytime when, due to the brightness of the surrounding light, the illumination of the incandescent lamp might be overlooked, but the slight click which would be made upon the release of the mechanical annunciator together with its movement forwardly from the face of the lamp casing or housing would be sure to attract the operator's attention and he could then look more closely at the lamps to see which is lighted.

It is preferred that the connections be made to the incandescent lamps so that when the casing for the lamps is set up in the car, the upper left lamp will be connected with the switch associated with the left front tire and the lower left lamp will be connected with the switch for the left rear tire, the upper right lamp will be connected with the switch for the right front tire and the lower right lamp will be connected with the switch for the right rear tire. Thus from the position of the lamps, the driver will know when one of them is lighted, which tire needs attention. It will be readily apparent that when the tire is inflated again to full pressure and the switch tripping mechanism is re-set, the circuit will be again ready for service. Naturally, as soon as the free end of the trip plate 21 leaves the spring 36 of the adjacent switch, the switch will be open and thus as the wheel rotates while the tire thereon is in need of more air, the incandescent lamp controlled by the switch will go on and off so as to give a flashing signal.

The mechanical annunciator is re-set merely by pressing against the button 65' to shift the bar 65 inwardly so as to permit it to be engaged by the spring pressed armature 67.

What is claimed is:

1. An actuator for a tire pressure signal control switch having a shiftable element, comprising a pair of spring actuated arms, a bracket common to said arms and securing the same to the inner side of a vehicle wheel, one of said arms being constantly in contact with the inner side of the tire and the other arm extending inwardly from the wheel, the said spring actuating means for the said other one of the arms normally urging the oscillation of the arm toward the axial center of the wheel, and a latch finger coupled with the first one of the arms and engaging the said other one of the arms to hold the same against movement, the said other one of the arms when released by the latch means moving radially inwardly for intermittent engagement with the switch shiftable element during rotation of the wheel to actuate said switch.

2. An actuator for a tire pressure signal control switch, comprising a trip arm secured to the wheel and having swinging movement radially thereof, resilient means normally urging said trip arm to move toward the radial center of the wheel, a second arm secured to the wheel adjacent the trip arm, resilient means normally urging the second arm into contact with the side wall of the tire, and a latch finger coupled with the second arm and having detachable engagement with the first arm to maintain the latter from movement under the urge of the first resilient means, toward the center of the wheel.

3. An actuator for a tire pressure signal control switch, comprising a bracket designed for attachment to the inner side of a wheel and having a pair of inwardly diverging arms spaced radially of the wheel, a tire casing engaging arm oscillatably supported upon the outer one of the first arms and having an end arranged to position against the inner side of the tire casing, spring means normally urging said end into engagement with the casing, the opposite end of the casing contacting arm being extended to form a latch finger, an elongated trip plate pivotally attached at one end to the inner one of the bracket arms, spring means engaging and normally urging swinging of the trip plate to move the other end thereof toward the axial center of the wheel, a keeper carried by the trip plate and adapted for engagement by said latch finger to hold the trip plate against movement by the spring associated therewith, said latch finger being released from the trip plate by pressure from the tire upon bulging of the tire due to deflation causing the casing engaging arm to be swung inwardly, and the said other end of the trip plate when the plate is released moving radially inwardly to effect actuation of the control switch.

OTTO E. DIETRICH.